May 9, 1950     C. C. FUERST     2,507,150
FOCUSING STOP MECHANISM FOR CAMERA SHUTTERS
Filed Sept. 10, 1948     3 Sheets-Sheet 1
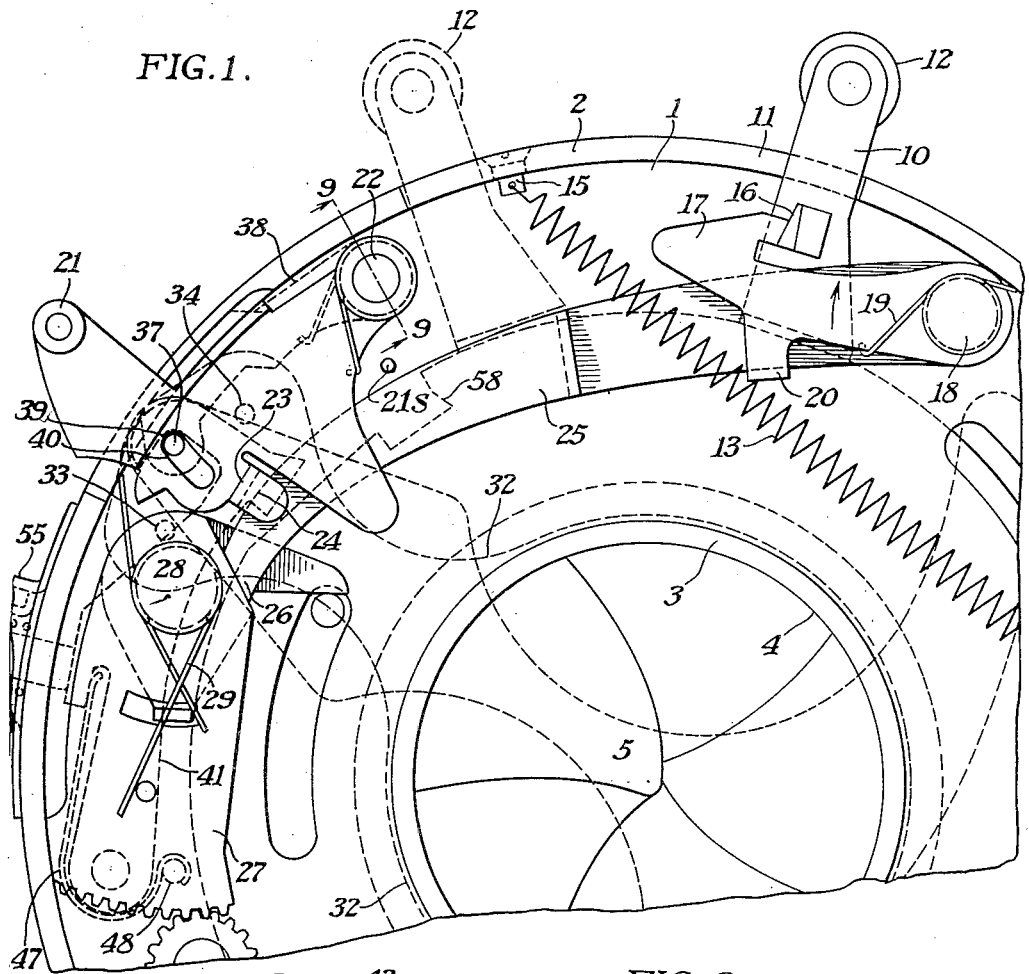
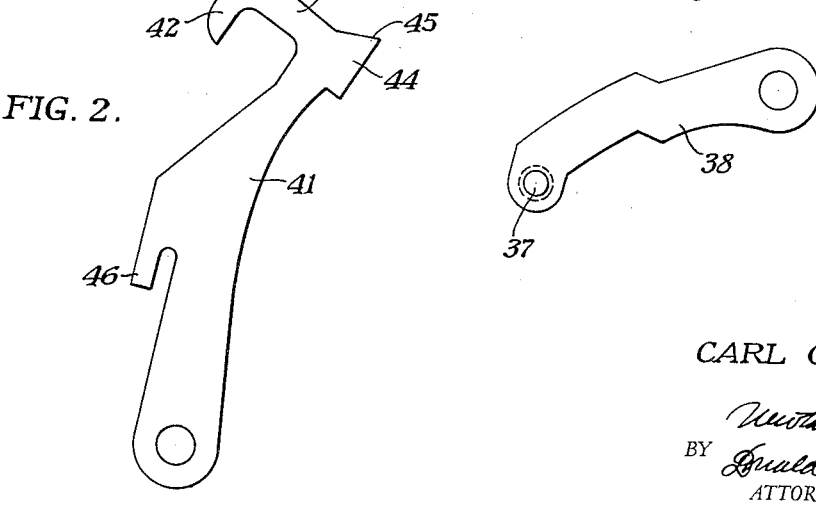
CARL C. FUERST
INVENTOR
BY
ATTORNEY May 9, 1950 C. C. FUERST 2,507,150
FOCUSING STOP MECHANISM FOR CAMERA SHUTTERS
Filed Sept. 10, 1948 3 Sheets-Sheet 2
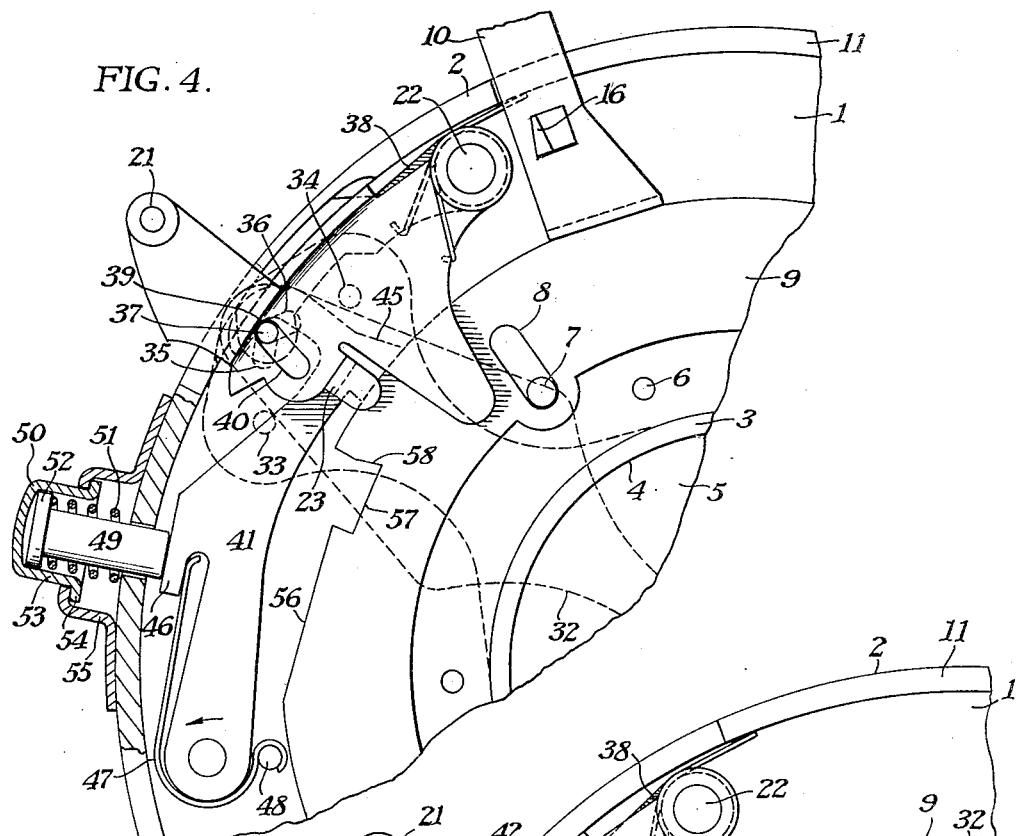
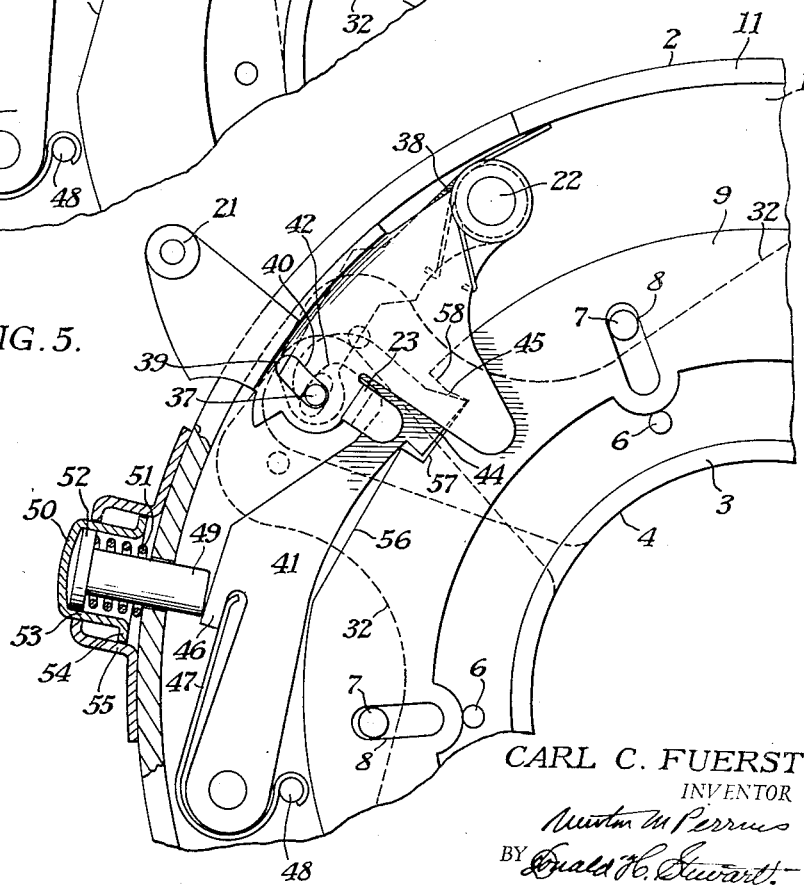
CARL C. FUERST
INVENTOR
ATTORNEY May 9, 1950 — C. C. FUERST — 2,507,150
FOCUSING STOP MECHANISM FOR CAMERA SHUTTERS
Filed Sept. 10, 1948 — 3 Sheets-Sheet 3

CARL C. FUERST
INVENTOR
ATTORNEY

Patented May 9, 1950

2,507,150

UNITED STATES PATENT OFFICE 2,507,150

FOCUSING STOP MECHANISM FOR CAMERA SHUTTERS

Carl C. Fuerst, Rochester, N. Y., assignor to Eastman Kodak Company, Rochester, N. Y., a corporation of New Jersey Application September 10, 1948, Serial No. 48,681

6 Claims. (Cl. 95—60)

This invention relates to photographic shutters and particularly to a focusing stop mechanism for such shutters. One object of my invention is to provide a stop mechanism in which an operator, through pressure on a button, and by partially setting shutter blades, may move the blades to an open position for focusing without disturbing the time and/or diaphragm settings of the shutter. Another object of my invention is to provide a mechanism of the type described in which cover blinds, as well as shutter blades, are held in an open position for focusing. Still another object of my invention is to provide an inexpensive linkage in a shutter of known type through which the shutter is conditioned for focusing and after which the shutter may be fully set to make an exposure, or in which the shutter parts may return to an unset position of rest. Other objects will appear from the following specification, the novel features being particularly pointed out in the claims at the end thereof.

In shutters of the so-called between-the-lens type, the shutter mechanism is usually quite complicated, and unless other means is provided, in order to focus on a ground glass, it is necessary to adjust the shutter speed controls to a "time" or "bulb" position, open the blades for focusing, close the blades after focusing, re-set the shutter time-adjusting mechanism, and make the exposure. A number of shutters have been provided with focusing stops which eliminate some, or all, of these operations so that pressure on a single member is all that is required to open the blades for focusing; typical examples of such shutters being as follows: U. S. 2,249,540, Riddell, July 15, 1941, 95/63; 2,333,820, Riddell, November 9, 1943, 95/63; 2,412,681, Fuerst, December 17, 1946, 95/63.

It is to this type of focusing stop that my invention is directed, although the construction is quite different as, in the present instance, it is necessary to open not only shutter blades but cover blinds.

In order to obtain a shutter capable of extremely high speeds, such as 1/900 or 1/1000 of a second, I have provided a mechanism of the same type as shown in my copending application Serial No. 728,528, Direct acting shutter, filed February 14, 1947.

The shutter blades are moved in a single direction in opening and closing the shutter, and a pair of cover blinds are utilized to cover the opening at all times except when an exposure is being made. Consequently, my present invention is directed to a focusing stop mechanism for shutters which includes both the cover blinds and shutter blades as both of these must be held in an open position for focusing.

Coming now to the drawings wherein like reference characters denote like parts throughout:

Fig. 1 is an enlarged top plan view of a portion of a shutter provided with a focusing stop mechanism constructed in accordance with and embodying a preferred form of my invention. The shutter cover plate and other portions of the shutter have been removed to show the particular part of the mechanism included in the present invention;

Fig. 2 is a top plan view of the main stop lever removed from the shutter casing;

Fig. 3 is a view similar to Fig. 2 but of a second lever which engages and moves the cover blind;

Fig. 4 is a fragmentary detailed view partially in section showing the focusing stop mechanism in an inoperative position;

Fig. 5 is a view similar to Fig. 4 but with the focusing stop mechanism in an operative position;

Figure 6:
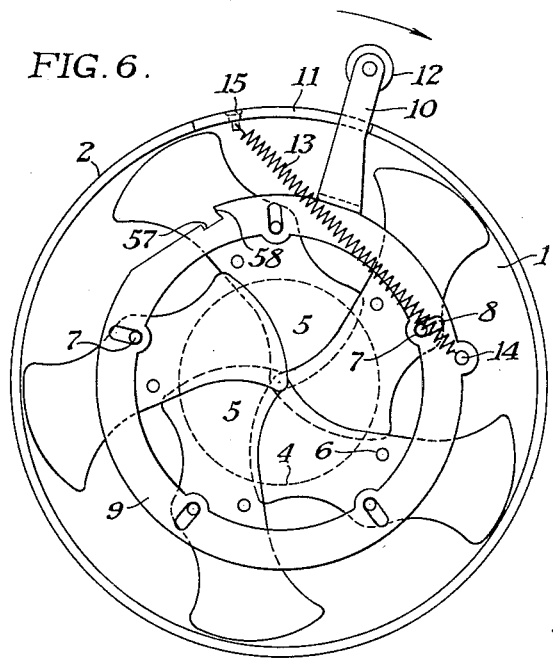
Fig. 6 is a fragmentary detailed top plan view showing schematically the shutter blades, as well as the blade operating ring.

My present invention relates to a shutter in which a push button is provided which can be depressed to position a focusing stop mechanism so that, as the setting lever of the shutter is moved towards its set position, the shutter blades will be halted in their fully open position and they will be retained in this position as long as the push button is depressed. In addition, the operation of this push button also moves a second lever which opens the cover blinds so that both the cover blinds and the shutter blades will be held in an open position without operation of the shutter trigger. More specifically, referring to Fig. 1, my improved mechanism may be applied to a shutter of the type shown in my copending application above referred to. The shutter may consist of an annular casing 1 having an upstanding flange 2 extending around the periphery of the shutter and including a flange 3 extending around an exposure opening 4. This exposure opening is covered by a plurality of shutter blades 5. Referring to Fig. 6, the shutter blades 5 are double-ended and each blade is pivoted on a stud 6 to the shutter casing 1 and includes a pin 7 extending up into a slot 8 carried by the blade ring 9. This blade ring is mounted to turn on the shutter casing 1 in any suitable known manner. The blade ring likewise includes a handle 10 extending outwardly through a slot 11 in the upturned flange 2. A handle 12 may be used and may be turned in the direction shown by the arrow to tension a power spring 13 attached to the blade ring stud 14 at one end and to a stud 15 in the flange 2 at the opposite end.

The shutter is held with the blade ring in its set position shown in Fig. 1 when the handle 10 is moved through its slot 11 to the position shown in full lines in which a lug 16 is engaged by a latch member 17.

This latch member turns on a pivot 18 and is held in the direction shown by the arrow by means of a spring 19. A lug 20 limits the movement under the impulse of the spring. The shutter release mechanism includes a trigger 21 pivoted on a stud 22 and including a flange 23 adapted to engage an edge 24 of the trip lever 25. This lever is pivoted on the stud 18 at one end and has a beveled edge 26 on the opposite end. The movement of the trigger is so limited (by a suitable stop, such as pin 21s) that the trigger 21 cannot press lever 25 downwardly a distance to release latch 7 from latch 16. However, it may start the downward movement of this lever and move it to such an extent that the power-operated trigger release 27, pivoted on stud 28, and movable in a counterclockwise direction by a spring 29, will be released from its set position and, through its movement, may still further move lever 25 until the latch 17 is released from the lug 16, thereby permitting the spring 13 to swing the blade ring rapidly in a counterclockwise direction from its Fig. 6 position, making an exposure.

Figure 7:
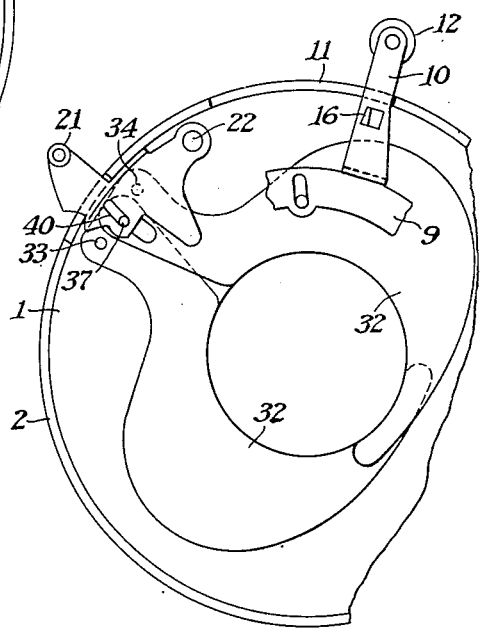
Fig. 7 is a view similar to Fig. 6 but showing schematically the cover blinds and their relation to the shutter stop mechanism.
Figure 8:
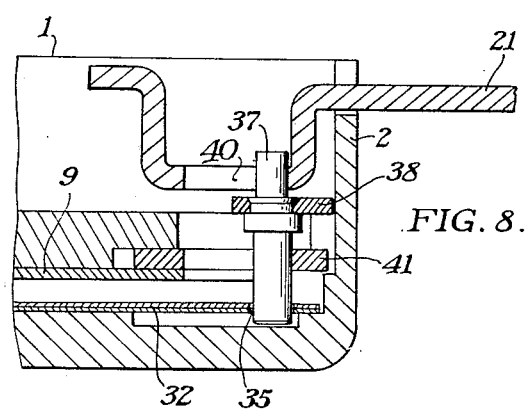
Fig. 8 is an enlarged fragmentary section showing the relation of the shutter trigger and parts of the focusing stop mechanism.
Figure 9:
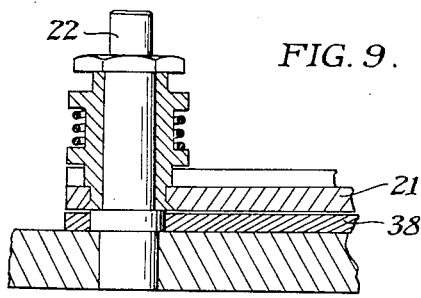
Fig. 9 is an enlarged fragmentary section on line 9—9 of Fig. 1.

Referring to Fig. 7, when the trigger 21 is depressed it is, of course, necessary to first open the cover blinds 32; each of these cover blinds being somewhat crescent shaped, one being right-hand and the other being left-hand. These blades are pivoted on studs 33 and 34 which are spaced apart and each blade, as shown in Figs. 4 and 5, is provided with a slot 35 and 36 through which an upstanding pin 37 passes. Referring to Fig. 3, the pin 37 is carried by a second lever 38 which is mounted to turn on the stud 22, supporting the trigger 21. Thus, each time the cover blinds 32 are to be moved, the lever 38 is moved, swinging the pin 37 between the studs 33 and 34; this movement being possible by reason of the slots 35 and 36.

As thus far described, the shutter is the same as the shutter shown in my copending application Serial No. 728,528 (except for lever 38), and reference may be had to this application for further details of the shutter mechanism.

Lever 38 is new with this application. It must move each time the cover blinds 32 move, whether these cover blinds are moved by the trigger 21 or whether the cover blinds are moved by the focusing stop. If the trigger 21 is used to move the cover blinds 32, it is done by depressing the trigger so that the upper end 39 of a slot 40 in the trigger may engage the upstanding pin 37, moving the second lever 38 as the cover blinds 32 are moved. However, the second lever 38 may be moved without moving the trigger. This may be done by the focusing stop lever 41. As shown in Fig. 2, stop lever 41 is provided with a hook 42 on the end of an arm 43. It is also provided with a lug 44 having a beveled surface 45. A second arm 46 provides a recess for a spring 47, best shown in Fig. 4. This spring lies in the recess behind arm 46 and encircles a pin 48, normally holding the lever 41 in the direction shown by the arrow and pressed against a plunger 49 of a push button 50 which is used to operate the focusing stop mechanism. A spring 51 bears against a head 52 on the pin 49 to hold the parts in the Fig. 4 position. The outside 50 of the push button is in the form of a cap 53 having a flange 54 limiting the outward movement of the cap in the ferrule 55 attached to the shutter flange 2. When this push button is depressed, the latching end 44 of the stop lever is pressed downwardly against the edge 56 of the blade ring. By turning the setting lever 12 in a clockwise direction, the stop 44 rides on the blade ring and drops into a notch 57, so that the beveled end 45 may engage the beveled recess 58 in the blade ring, thereby holding the blade ring in the Fig. 5 position in which the shutter blades 5 and the cover blinds 32 are in a fully open position. Focusing can now be accomplished. After the focusing is completed, the setting lever 12 may be moved slightly in a clockwise direction. This releases the beveled end 45 from the beveled recess 58 in the blade ring and permits the spring 47 and the spring 51 to restore lever 41 and pushbutton 50 to the Fig. 4 position. The operator may now continue to set the shutter by moving the lever 12 in the direction shown by the arrow in Fig. 6 until the latch elements 16 and 17 engage, in which position the shutter spring 13 is tensioned and the shutter is in condition for a normal exposure.

It should be noticed that I have taken precautions to prevent a sudden strain on the shutter parts through the action of the spring 13 on the blade ring 9. These precautions require that the pushbutton 50 be held in and the shutter be set at the same time. The tendency to suddenly thrust the shutter to its open position, or to allow the blade ring to move rapidly and snap against a stop, is eliminated, since the normal setting movement of the shutter occurs under a comparatively light and steady pressure. Consequently, the parts are not damaged in opening. The same is true in closing, because it is necessary for the operator to hold the setting lever 12 and, in fact, to slightly move this in order to release the latch elements 45, 58. Thus, in releasing this mechanism, the setting lever must be slowly moved so that the parts are not subject to a sudden shock, as might otherwise occur.

As will appear from the above description, the shutter mechanism can be readily modified by the addition of the focusing stop mechanism to provide a camera shutter in which the two sets of blades, the exposure-making blades, and the cover blinds can be simultaneously opened and held in an open position for focusing without the use of the shutter trigger and without changing the speed or diaphragm setting of the shutter. The operation merely consists in pressing in a pushbutton and holding it inwardly as the setting lever is moved to approximately half of its travel, at which time latch elements 45, 58 will be engaged. With the cover blinds open and the shutter blades open, focusing can be accomplished and by moving the setting lever again in a setting direction after releasing the pushbutton 50, the shutter will move to a fully set position so that an exposure can be made by the trigger 21 in the normal manner. If the operator should not desire to set the shutter after first moving the setting lever 12 slightly in a setting direction to release the focusing stop mechanism, he may permit the shutter blades to return to their normal position of rest shown in broken lines by the setting lever 12 in Fig. 1.

I claim:

1. A focusing stop mechanism for camera shutters of the type including an exposure aperture, pivoted shutter blades, a notched blade ring to which the blades are operably connected, mechanism for moving the blade ring to make an exposure, said mechanism including a power spring, means for tensioning the power spring, cover blinds pivotally mounted in the shutter, means for simultaneously operating the cover blinds to open and close the exposure aperture, said stop mechanism comprising a lever, a pin on the lever engaging a slot in a cover blind for operating the cover blinds by the lever, a spring tending to hold the lever and cover blinds in a position in which the cover blinds close the exposure aperture, a trigger for releasing the shutter mechanism, a wall on the trigger for moving the cover blinds and lever to move the cover blinds to an open position, a stop lever normally spring pressed to an inoperative position, a wall on the stop lever movable with the stop lever to an operative position to engage the pin on the first-mentioned lever and move the lever and cover blinds to an open position, a stop on the stop lever for engaging the notched blade ring when the lever is moved from its inoperative position to an operative position and the blade ring is in a position to open the shutter blades whereby both the shutter blades and cover blinds may be opened for focusing.

2. The focusing stop mechanism defined in claim 1 characterized by the wall on the stop lever which engages the pin for operating the cover blinds being hook-shaped whereby the pin may be moved from the wall of the stop lever while the stop lever remains in an inoperative position.

3. The focusing stop mechanism defined in claim 1 characterized by the wall on the trigger which moves the cover blinds to an open position normally lying adjacent the pin operating the cover blinds on one side only whereby said cover blinds may be operated moving the pin away from the wall on the trigger while the trigger remains in an inoperative position.

4. The focusing stop mechanism defined in claim 1 characterized by the wall on the stop lever which engages the pin for operating the cover blinds being hook-shaped whereby the pin may be moved from the wall of the stop lever while the stop lever remains in an inoperative position, and the wall on the trigger which moves the pin operating the cover blinds lies on one side of said pin in a rest position whereby the pin may move from said wall when the cover blinds are moved by the stop lever.

5. A focusing stop mechanism for camera shutters of the type including a casing, an exposure aperture therein, shutter leaves pivotally mounted in the casing, a notched blade ring to which the shutter blades are operably connected, said mechanism including a power spring, means for setting the power spring and cover blinds mounted in the casing, means for simultaneously operating the cover blinds to open and close the aperture, said focusing stop mechanism comprising a lever pivotally mounted in the casing, operative connections between the lever and cover blinds for operating the latter by the former, a spring for holding the lever and cover blinds in an aperture closing position, two means for coacting with the lever for moving the lever against the spring and opening the aperture by moving the cover blinds therefrom, a trigger constituting one of said means, a stop lever constituting the other of said means, a stop on the stop lever movable into contact with the notch in the blade ring when the shutter blades are in an open position for holding the blades open, both the trigger and the stop lever including manually operable means movable independently of each other for actuating the cover blinds to open the cover blinds.

6. The focusing stop mechanism defined in claim 5 characterized by the means for coacting between the trigger and lever and the stop lever and lever including a pin carried by the stop lever lying in the path of movement of a wall on the trigger and a wall on the stop lever whereby either the trigger or the stop lever may open the cover blinds by moving the pin in one direction, the spring closing the cover blinds after actuation of either the trigger or the stop lever.

CARL C. FUERST.

No references cited.